United States Patent

McFarland et al.

[11] 4,034,665
[45] July 12, 1977

[54] PISTACHIO HULLER

[75] Inventors: Jay J. McFarland, Bakersfield; Bertram E. Saunders, Oildale, both of Calif.

[73] Assignee: California Almond Orchards, Bakersfield, Calif.

[21] Appl. No.: 587,918

[22] Filed: June 18, 1975

[51] Int. Cl.² .................. A23N 5/05; A47J 43/00; A23N 7/00; A47J 17/16
[52] U.S. Cl. .................. 99/574; 99/579; 99/625
[58] Field of Search .......... 99/520, 521, 523, 585, 99/539, 540, 567, 609, 612, 613, 617, 618, 619, 624, 625, 626, 627, 628, 623, 575, 579, 574; 308/189 R, 207 R

[56] References Cited

U.S. PATENT DOCUMENTS

| 1,190,554 | 7/1916 | Kelly | 99/628 |
|---|---|---|---|
| 1,294,852 | 2/1919 | Vaughn | 99/575 |
| 1,322,300 | 11/1919 | Gooding et al. | 99/625 |
| 1,350,506 | 8/1920 | Kennedy | 99/625 X |
| 1,393,168 | 10/1921 | Sangiuliano | 99/625 |
| 1,859,458 | 5/1932 | Northrop | 99/585 |
| 2,144,841 | 1/1939 | Glaser | 99/579 X |
| 2,249,787 | 7/1941 | Savage | 99/624 X |
| 2,433,730 | 12/1947 | Bridge | 99/625 |
| 2,776,690 | 1/1957 | Warren | 99/585 |

Primary Examiner—Harvey C. Hornsby
Assistant Examiner—Robert Pous
Attorney, Agent, or Firm—Huebner & Worrel

[57] ABSTRACT

A pistachio huller having two stages; a first stage including a pair of rollers between which the pistachios are passed to rupture the pericarps thereof to form tag ends of pericarps adherent to the shells of the pistachios and a second stage including a plurality of parallel fine rollers closely spaced to preclude the passage of pistachios therebetween with the adjacent fine rollers alternately and oppositely oscillated to strip the tag ends of pericarps from the pistachios.

15 Claims, 12 Drawing Figures

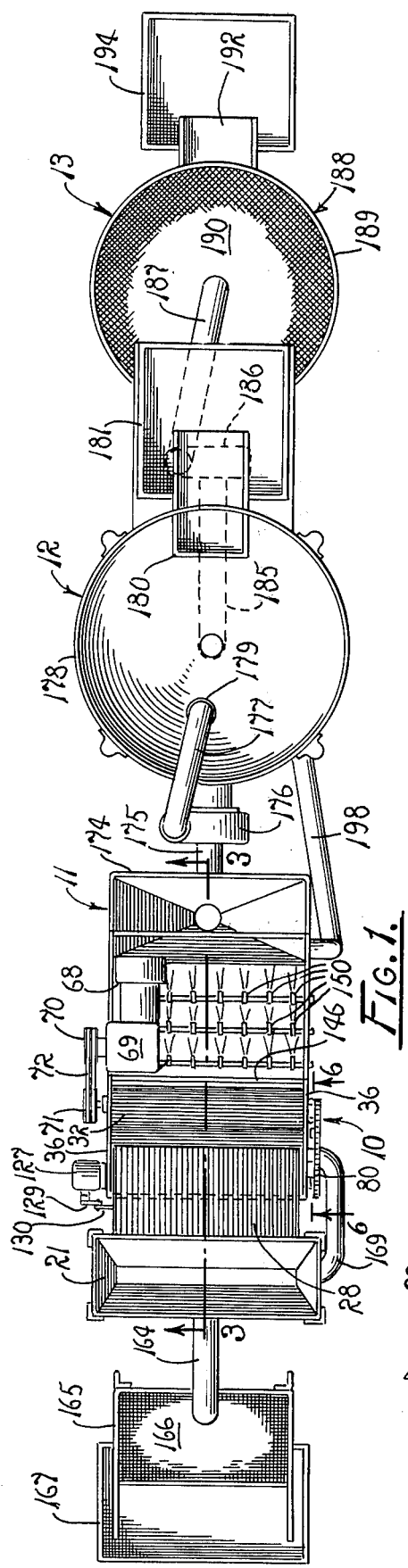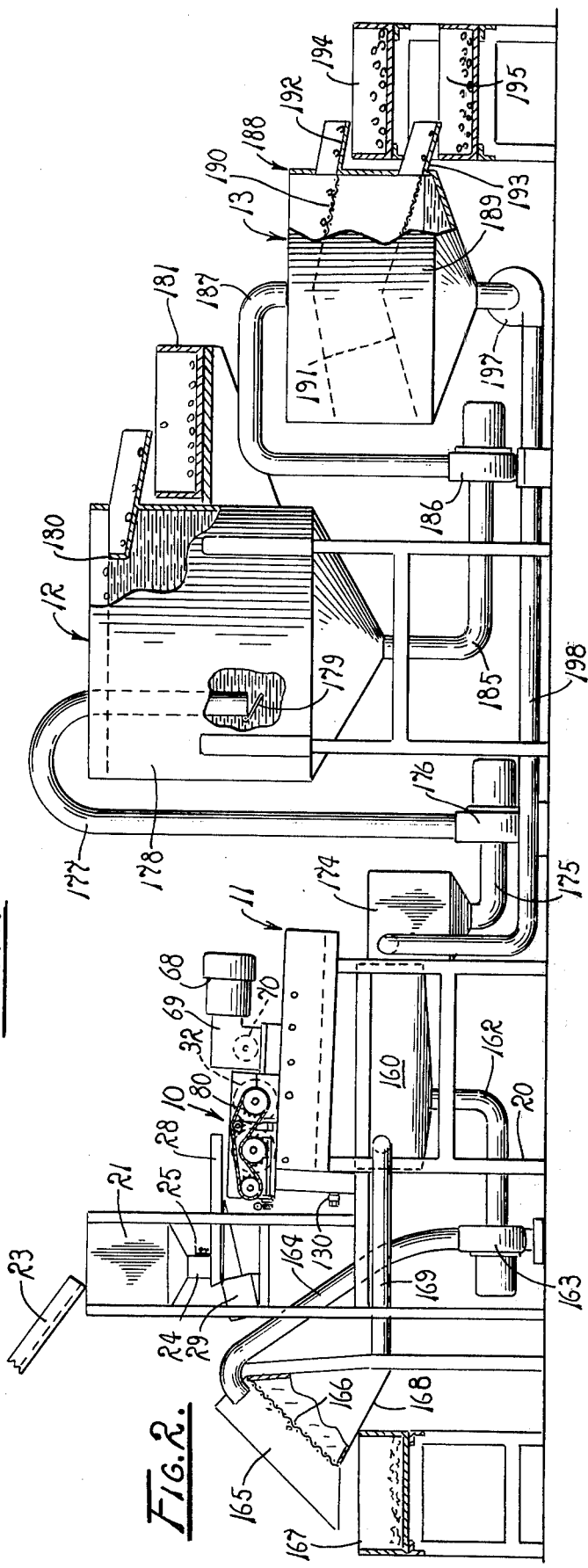

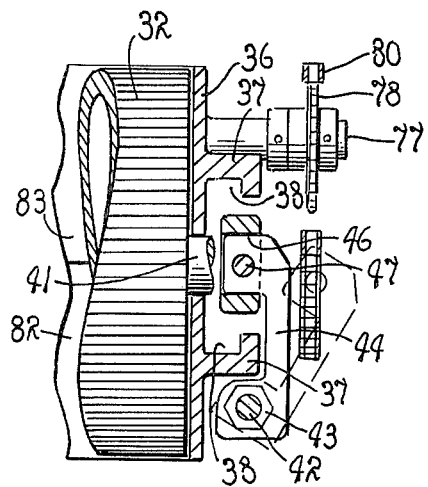
FIG.8.
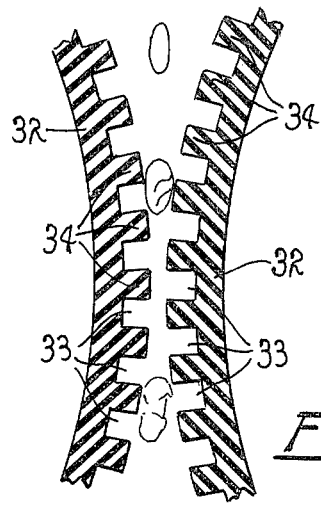
FIG.9.
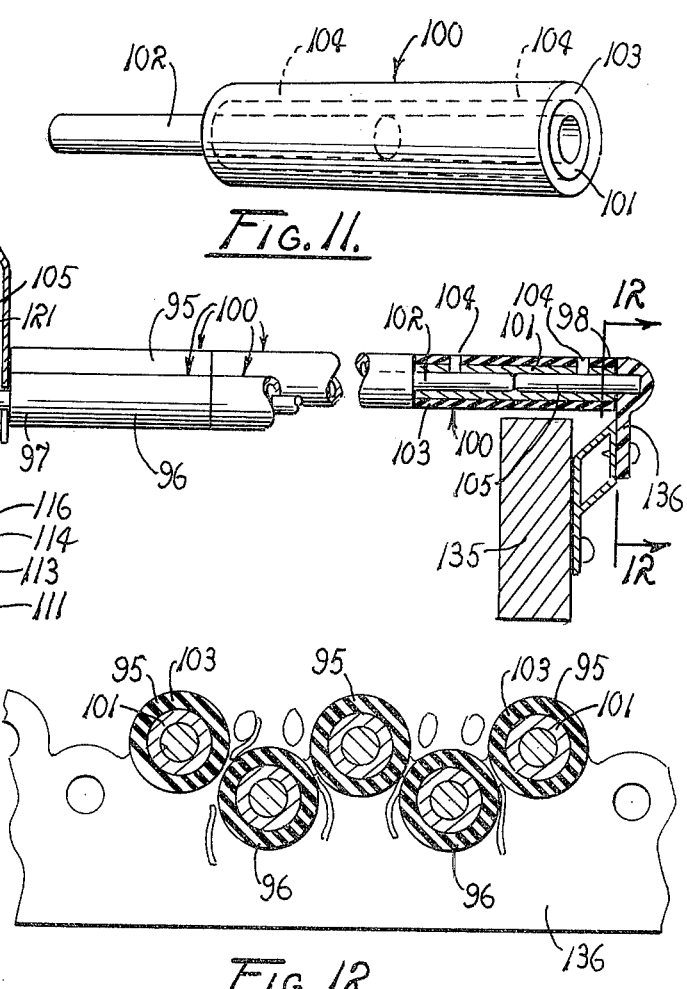
FIG.10.
FIG.11.
FIG.12.

PISTACHIO HULLER

FIELD OF THE INVENTION

The present invention relates to a pistachio huller and more particularly to such a huller having a first stage which ruptures the pericarps of the pistachios to remove portions of the pericarps from the pistachio shells and which leaves portions adherent to the shells but with loose ends and a second stage engageable with the loose ends to strip the pericarp from the shells.

BACKGROUND OF THE INVENTION

With the discovery during recent years that pistachios can be grown commercially in the San Joaquin Valley of California, substantial acreages of this delicious nut were promptly planted. Such plantings are now coming into production. However, it has now been discovered that without the cheap labor of the foreign countries growing pistachios, it is not economically feasible to hull the harvested pistachios by hand. Further, insofar as can be determined, there has never previously been a practical mechanical huller for pistachios. Thus, after nurturing for many years hundreds of acres of delicate pistachio trees to the point of production, the entire domestic production of pistachios is threatened with collapse before it reaches full production because of the expense of processing pistachios for market.

Further, the hulling of pistachios presents unusual problems of difficult solution. The pericarp of pistachios is stronger, more tenaciously adherent to the shells, and more difficult to remove than the pericarps of many nuts. If the pericarp is not promptly removed from pistachios after harvest, it discolors the shells requiring that the normally attractive straw colored shells be colored to hide undesirable stains. For this reason, most commercial pistachios are dyed an unnatural and undesirable pink or red color to obscure the stains. Even with abundant hand labor available to foreign producers, it is usually not feasible to hull sufficiently large volumes of pistachios soon enough after harvest to avoid shell discoloration.

SUMMARY OF THE INVENTION

An object of the present invention is therefore to provide a mechanical huller for pistachios and the like.

Another object is to minimize shell discoloration in pistachios by providing a huller having sufficient capacity to hull large quantities of pistachios immediately following their harvest.

Another object is to provide a huller capable of hulling pistachios efficiently and effectively with a minimum of harm to the resultant product.

A further object is to provide a huller having hulling rollers which are quickly and easily installed and removed for cleaning, repair and replacement.

Still further objects and advantages are to provide improvded elements and arrangements thereof in a huller which is economical, durable and particularly effective in hulling pistachios.

BRIEF DESCRIPTION OF THE DRAWINGS

FIG. 1 is a top plan view of a pistachio huller embodying the principles of the present invention shown in association with apparatus ancillary to its operation.

FIG. 2 is a side elevation of the structure shown in FIG. 1.

FIG. 8 is an enlarged fragmentary view of a roller and mounting for the roller utilized in a first stage of the present invention.

FIG. 9 is an enlarged fragmentary transverse section of coacting rollers utilized in the first stage of the present invention.

FIG. 10 is a section taken on line 10—10 of FIG. 7.

FIG. 11 is a perspective view of a segment of a fine roller employed in the second stage of the present invention.

FIG. 12 is an enlarged transverse fragmentary section of the fine rollers as operated to hull pistachios taken at the position indicated by line 12—12 in FIG. 10.

DESCRIPTION OF THE PREFERRED EMBODIMENT

Figure 3:
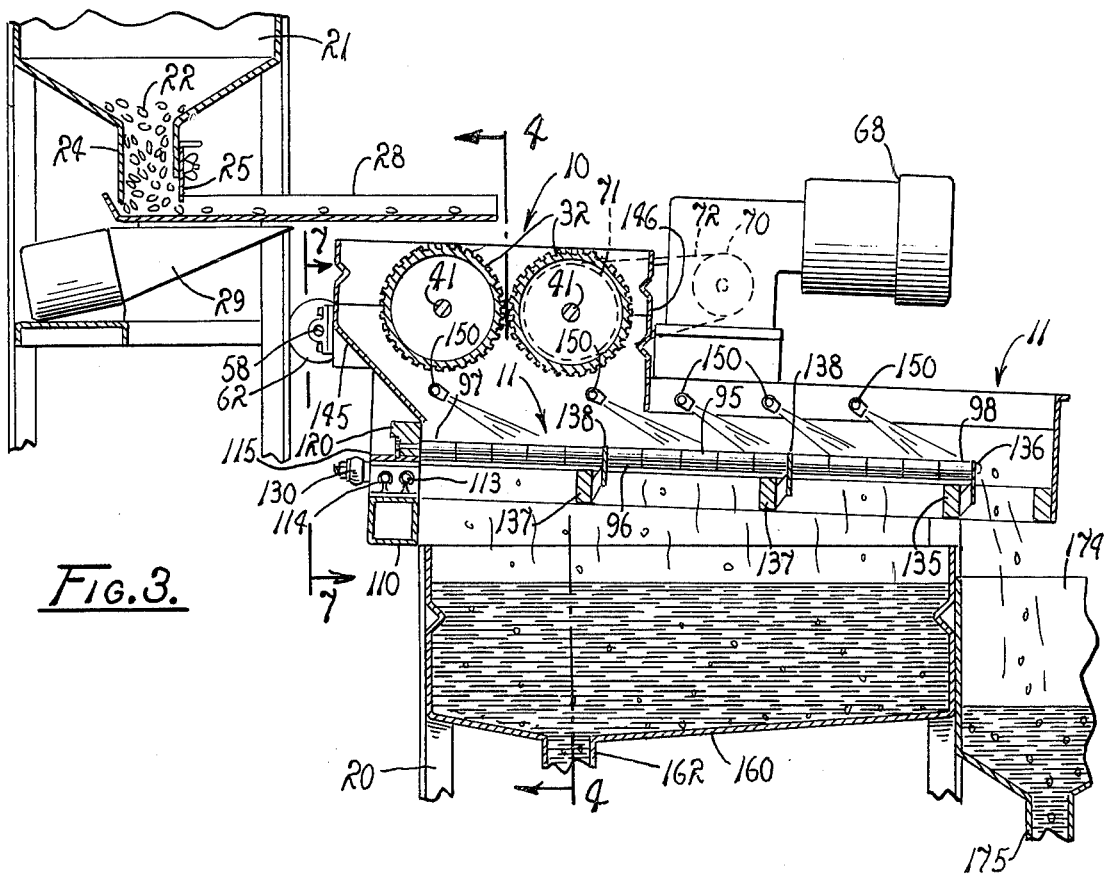
FIG. 3 is a section taken on line 3—3 of FIG. 1.

Referring first to FIGS. 1 and 2, a first stage of the huller is shown at 10 at which substantial portions of the hulls are removed from the pistachios, a second stage 11 at which the remainder of the hulls is removed, a separator 12 to separate defective hulled pistachios from usable hulled pistachios and a sizer 13 at which the pistachios are segregated as to size. As will subsequently become more clearly apparent, the two stages of the huller, the separator, and the sizer are connected in series relation adapted to receive pistachios having hulls as they are harvested from an orchard and to deliver hulled pistachios which have been cleaned and graded and sized.

The first two stages of the huller are mounted on any suitable frame 20 which supports a hopper 21 in an elevated position to receive unhulled pistachios 22, as from a chute 23. The hopper has an elongated outlet 24 provided with an adjustable gate 25 through which pistachios can be gravitationally metered.

An elongated tray 28 is mounted by any suitable means, not shown, in the frame 20 with one end disposed below the throat 24 and an opposite end outwardly extended therefrom. The tray is longitudinally corrugated and vibrated by means of a vibrator 29. The extended end of the tray is slightly lower than the end beneath the throat 24 and as the tray is vibrated, the pistachios are aligned longitudinally of the corrugations and delivered lengthways to the first stage 10. The tray and vibrator are conventional and are not illustrated in greater detail than shown in FIGS. 1 through 4.

In the first stage 10, a pair of rollers 32 are mounted horizontally in adjacent spaced relation to receive therebetween pistachios 22 descending from the extended end of the tray 28. As best shown in FIG. 9, the rollers have longitudinal grooves 33 defining radially disposed longitudinally extending teeth 34 therebetween. The grooves and teeth are complimentary with the teeth preferably substantially square in cross sections. The teeth are of rubber, resilient plastic or other resiliently compressible and durable material.

Although the rollers 32 are quite durable, in handling large quantities of pistachios, the teeth 34 become worn. A feature of the present invention is, therefore, to mount the rollers so they can be quickly and easily installed and removed.

Figure 4:
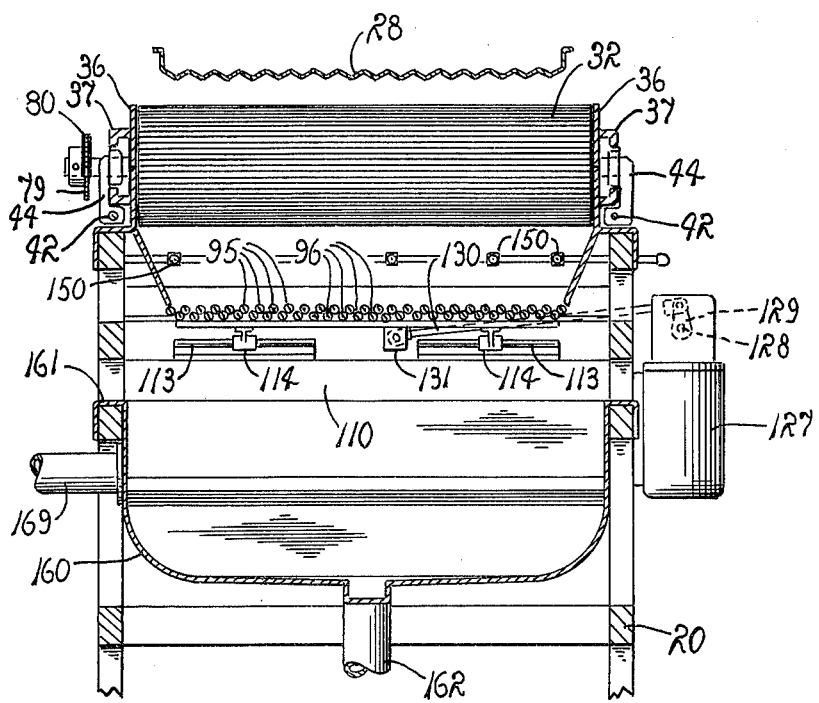
FIG. 4 is a section taken at the position represented by line 4—4 in FIG. 3.

As best shown in FIGS. 4 and 8, a pair of substantially rectangular plates 36 are mounted in the frame 20 in transversely erect parallel relation at the sides of the frame. A pair of spaced, opposed, L-shaped rails or guides 37 are mounted horizontally on the plates 36 to define channels 38 therebetween. A slide block 39 is fitted to each of the channels for slidable movement longitudinally thereof. Aligned bearings 40 are mounted in the blocks. Each of the rollers 32 has a concentric shaft 41. The shafts are oppositely axially extended from their respective rollers and the shaft of the first roller has its opposite ends mounted in the bearings 40 of the slide blocks.

A screw-threaded shaft 42 is mounted in the frame 20 in parallel spaced relation to each of the channels 38. A nut 43 is screw-threadably mounted on each of the shafts 42. A bracket 44 is weldably mounted on each nut and upwardly extended therefrom. As evident in FIG. 8, the brackets are laterally offset to avoid the channel members 37 and each has an inwardly extended ear 45. Each block 39 has a socket 46 adapted to receive the ear of its respective bracket 44. To assemble the brackets 44 in driving relation to the blocks 39, the brackets are pivoted upwardly about the screw-threaded shafts 42 until the ears 45 nest in the sockets 46. Capscrews 47 are then extended through aligned bores in the blocks 39 and the ears 45 and screw-threadedly engaged in screw-threaded bores 49 in the block.

Opposite ends of the shaft 42 are conveniently mounted in bearings 52. The forward end of each shaft is provided with a worm gearm 53 and the rearward end thereof with a thrust bearing 54. The worm gears and the thrust bearings engage against the shaft mounting bearings 52 and hold their respective shafts in fixed axial position while permitting their rotation.

Figure 7:
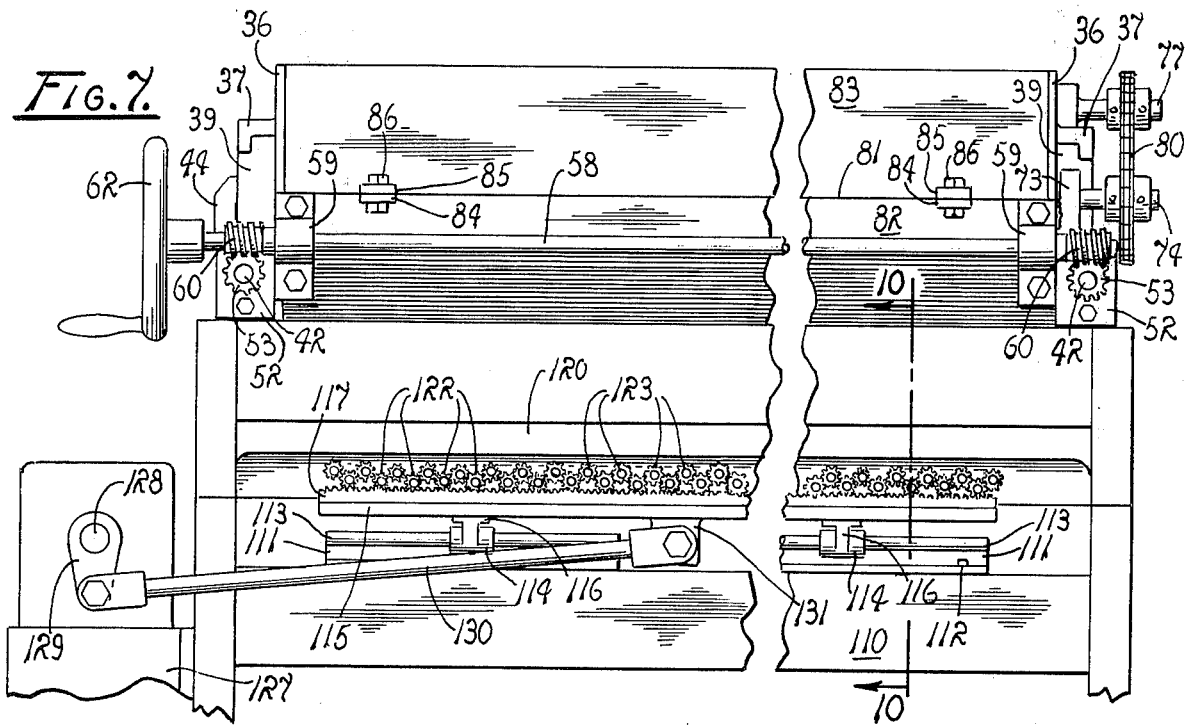
FIG. 7 is a fragmentary end elevation taken at the position represented by line 7—7 in FIG. 3.

As shown in FIG. 7, a control shaft 58 is rotatably mounted in bearings 59 in the frame 20 in parallel relation to the rollers 32. The control shaft provides worms 60 in mesh with the worm gears 53 so that as the control shaft is rotated, the shafts 42 are correspondingly rotated to advance or retract the nuts 43 and their brackets 44. For convenience of adjustment, a hand wheel 62 is mounted on the control shaft 58 in any convenient position. Thus, as the hand wheel 62 is rotated, the control shaft 58 operates through the worms 60 and worm gears 53 to advance or retract the nuts 43 and thus adjustably to position the first roller 32 in parallelism with the second roller. To accommodate adjustable positioning of the shaft 41 of the forward roller 32, an elongated opening 50 is provided through each of the plates 36.

Since it is not necessary adjustably to position both of the rollers 32, pillow blocks 65 having aligned bearings 66 are bolted to the frame 20 at 67 with the bearings 66 in alignment and parallel to the first roller. Opposite ends of the roller shaft 41 of the second roller are rotatably mounted in the bearings 66.

To drive the rollers 32, an electric motor 68 is mounted on the frame 20 and is connected to a transmission 69. The transmission provides a pair of drive sheaves 70, indicated in FIG. 1. A corresponding pair of sheaves 71 is mounted on the shaft 41 of the second roller. A pair of belts 72 circumscribe the sheaves 70 and 71 and provide driven interconnection therebetween.

Figure 5:
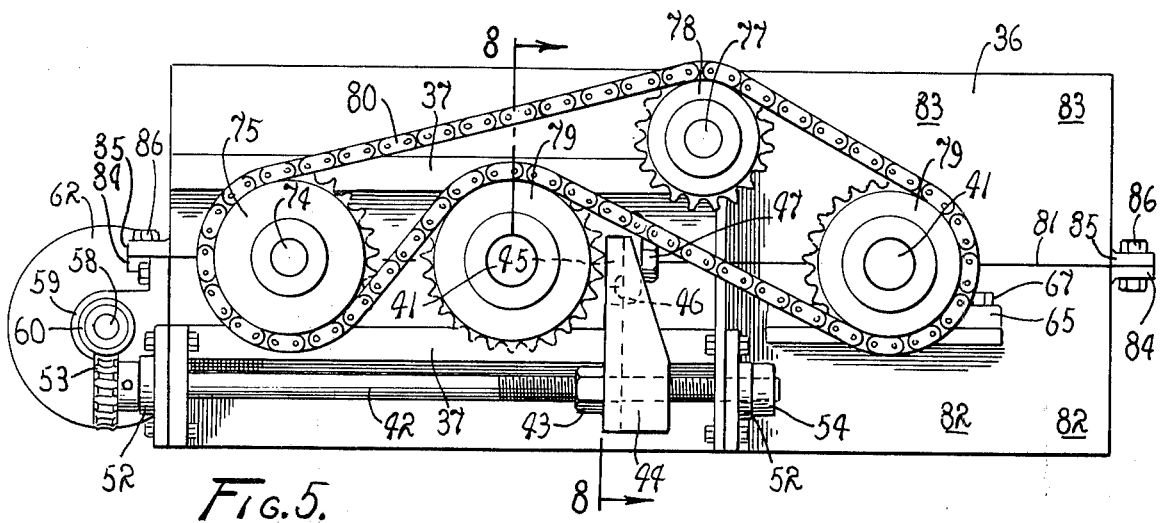
FIG. 5 is a somewhat enlarged side elevation of a first stage of the present invention.
Figure 6:
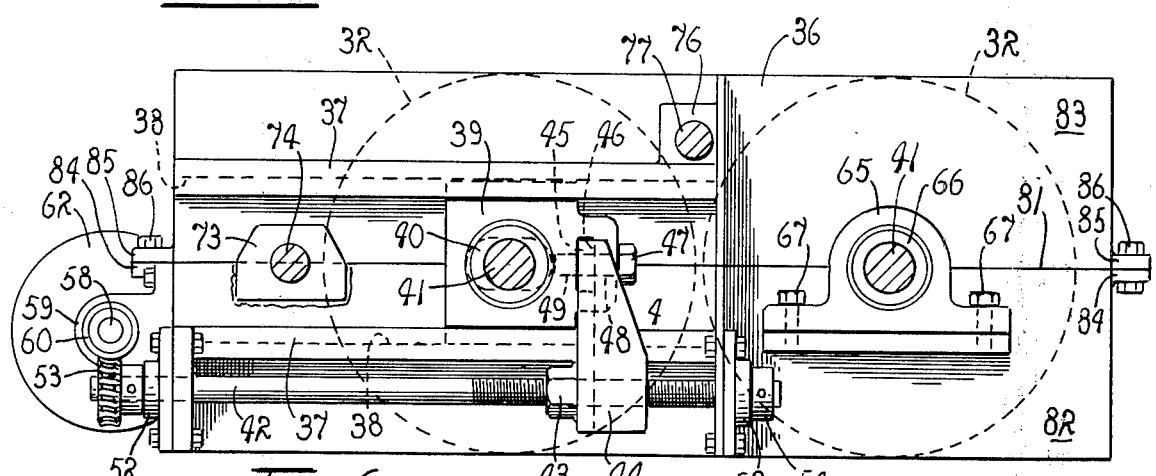
FIG. 6 is a section taken on line 6—6 of FIG. 1 and may also be visualized as the structure of FIG. 5 with certain drive sprockets removed to reveal otherwise hidden portions of the first stage.

As shown in FIG. 5, the shaft 41 of the second roller drives both rollers 32. A bracket 73 is mounted on the frame and supports a shaft 74 having an idler roller 75 journaled thereon. Similarly, a bracket 76 is mounted on the frame above the rollers 32 and mounts a shaft 77 having an idler roller 78 mounted thereon. Sprockets 79 are mounted on the roller shafts 41. A drive chain 80 is extended about the sprocket on the shaft 41 of the second roller, upwardly over the sprocket 79 mounted on the shaft of the first roller, about the idler sprocket 75, upwardly over the idler sprocket 78 and back to the roller 79 on the second roller. The transmission and relative sizes of the sprockets 79 are selected so that the second roller 79 is rotated at approximately 100 R.P.M. and the first roller 79 at approximately 115 R.P.M. by the motor 68. This gives the peripheries of the rollers 32 relative movement conducive to the rupturing and partial removal of their pericarps in the first stage 10. With the peripheries of the rollers 32 spaced so that the unhulled pistachios cannot pass therebetween without touching both rollers but so pistachios having their hulls removed but their shells intact can pass between the rollers, the rollers effectively rupture and fragment the pericarps of the pistachios and remove substantial portions thereof.

To facilitate removal of the rollers 32 and their shafts 41, the frame 20 is divided on a plane which intersects the centers of the shafts 41 along a parting line 81. The frame thus has a lower portion 82 and an upper portion 83. The upper and lower portions are held in assembled relation by any suitable means such as ears 84 on the lower portion 82 adjacent to ears 85 on the upper portion 83 and by nut and bolt assemblies 86 interconnecting the ears. Upon removal of the chain 76 and the nut and bolt assemblies 85, the upper portion 83 of the frame 20 can be lifted from the lower portion 82. To release the second roller 32, the bolts 67 are removed and the roller, the shaft 41, pillow block 65 and bearings 66 lifted from position. To release the first roller 32, the capscrews 73 are removed, the brackets 44 pivoted outwardly, to the dashed line position shown in FIG. 8, and the roller and its shaft 41 lifted from position.

The second stage 11, as best shown in FIGS. 3, 4, 7, 10, and 11 employs two tiers or layers of fine rollers 95 and 96. The fine rollers 95 are disposed in an upper plane and the fine rollers 96 in a lower plane. The fine rollers are parallel and successive rollers are in closely adjacent spaced relation, too close for the passage of pistachios therebetween but spaced sufficiently to receive tag ends of pericarp in clamped relation therebetween. As best seen in FIG. 12, the fine rollers are alternately disposed in the two tiers with the rollers in each tier spaced approximately the diameter thereof. As will subsequently become apparent, the rollers are oscillated and the group provides a receiving end 97 directly below the space between the rollers 32 to receive pistachios therefrom and an opposite delivery end 98.

Before considering the mounting and oscillating drive for the fine rollers 95 and 96, attention is invited to their structure as seen in FIGS. 10 and 11. Each roller 95 and 96 consists of a succession of segments 100 interconnected in axial alignment. Each segment has a metal cylinder 101 with a metal rod 102 snugly fitted thereto and a circumscribing sleeve of resilient material, such as rubber or plastic, 103. The rods 102 interconnect axially aligned cylinders 101 by extension approximately half way into each thereof and are secured by setscrews 104 screw-threadedly mounted radially in the cylinders 101 in positions to be tightened against the rods. At opposite ends of the fine rollers 95 and 96, elongated rods 105 are secured in the endmost sleeves 103 by setscrews 104 and axially extended as journals for their respective fine rollers At the head end of the frame 20, a box beam 110 extends horizontally transversely of the frame. A pair of brackets 111 are bolted at 112 to the box beam. Each bracket mounts a cylindrical guide rod 113 with the guide rods in horizontal parallel spaced relation. Fractionally cylindrical linear bearings 114 are mounted on the guide rods and support a carriage 115 bolted to slide blocks 116 in which the linear bearings 114 are mounted. Thus, the slide blocks and carriage are mounted for slidable reciprocal movement along the guide rods 113. A rack gear 117 is mounted longitudinally on the carriage 115 as shown in FIGS. 7 and 10.

A support bar 120 is mounted in the frame 20 horizontally above the carriage 115 and in spaced relation thereto to avoid interference with reciprocal movement thereof. Two tiers of bearings 121 are mounted in the support bar 120 to receive the guide rods 103 for rotation therein. The bearings 121 are in parallel relation and are spaced to achieve the spacing of the fine rollers 95 previously described. Lower tiers of pinions 122 are mounted on the extended ends of the rods 105 of the fine rollers 96 of the lower tier and pinions 123 are mounted on the extended ends of the rods 105 of the fine rollers 95 of the upper tier.

As best shown in FIG. 7, the pinions 122 and 123 of the alternately adjacent fine rollers 95 and 96 mesh. Thus, whenever the fine rollers 96 rotate in a clockwise direction, the fine rollers 95 rotate in a counterclockwise direction and when the fine rollers 95 rotate in a clockwise direction, the fine rollers 96 rotate in a counterclockwise direction. It will be noted that the pinions 122 of the lower tier of fine rollers, mesh with the rack gear 117.

A motor 127 is mounted in the frame in substantial alignment with the guide rods 113 and provides a drive shaft 128 having an eccentric 129. A pitman 130 interconnects the eccentric 129 and a bracket 131 connected to the carriage 115. Thus, as the motor is operated, the pitman 130 serves to reciprocate the carriage 115 and the rack gear 117 which in mesh with the lower pinions 122 causes the pinions to oscillate in the same direction within their tier and in the opposite direction to the pinions in the other tier. At the opposite end of the fine rollers 95 and 96 from the pinions 122 and 123, a crossbar 135 is mounted transversely in the frame and supports bearings 136 which journal the endwardly extended rods 105 of their respective rollers in the relationship described. The bearings have outer surfaces continuous with the outer surfaces of the sleeves 103 to avoid obstructing the passage of pistachios 22 endwardly thereover. To maintain the fine rollers 95 and 96 in their precise relationship and minimize whipping due to oscillation, crossbars 137 are mounted in the frame 20 transversely beneath the fine rollers and nylon plate bearings 138 upwardly extended therefrom to receive the rods 102 journaled therein intermediate the endwardly aligned cylinders 101. Obviously bearings 136 and 138 may be of the same form if desired.

As best shown in FIG. 3, a sheet metal wall 145 is mounted in the frame 20 adjacent to the first roller 32 and downwardly extended from a position adjacent to the tray 28 to the receiving end 97 of the second stage. Similarly, a sheet metal wall 146 is mounted in the frame adjacent to the second roller 32 intermediate said roller and the transmission 73. The walls 145 and 146 with the plates 36 define a hopper having the rollers 32 in the upper end portion thereof and extending downwardly to the receiving end 97 of the second stage 11.

A series of spray nozzles 150 are mounted on the frame 20 above the fine rollers 95 and 96 and directed downwardly toward the fine rollers and obliquely toward the delivery end 98. Water under pressure is supplied to the nozzles from any suitable source and serves to moisten and soften the pericarp of the pistachios, to rinse the pericarp from the shells of the pistachios, to rinse the fragments of pericarp downwardly from the fine rollers, and to urge the cleaned pistachios still in their shells to the delivery end 98. To facilitate such movement to the delivery end under the urging of the sprayed water, the bearings 121, 136, and 138 are preferably positioned so that the rollers descend toward the delivery end 98 at approximately three degrees with respect to the horizontal.

A tank 160 having an open top 161 is mounted in the frame 20 beneath the fine rollers 95 and 96 to receive pericarp debris and water descending from the nozzles 150 between the rollers. A drain conduit 162 is connected to the tank 60 and to a fruit or sludge pump 163. The pump has a discharge conduit 164 which extends upwardly to chute 165 having a screen bottom 166. The chute 165 is directed to a bin 167 of any suitable form to receive debris from the screen 166. A funnel 168 is provided beneath the screen and catches the water descending therethrough for return to the tank 160 through a return conduit 169.

A hopper 174 is provided at the delivery end 98 of the second stage 11 to receive pistachios 22 therefrom. A portion of the water from the spray nozzles 150 reaches the hopper 174 but it is normally necessary to supply additional water from any suitable source, not shown. A conduit 175 leads from the bottom of the hopper 174 to a fruit or sludge pump 176 which has a gooseneck discharge 177 disposed in an elevated tank 178. The discharge 177 is extended downwardly in the tank 178 and has a lower end providing a check valve 179 to prevent water from siphoning back from the tank 178 to the pump 176. A weir 180 is provided in the upper portion of the tank so that immature pistachios, which are light and buoyant, and other buoyant debris, can float off over the weir for discharge into any suitable receiver 181.

From the bottom of the tank 178 a conduit 185 extends to a fruit or sludge pump 186 which has a discharge 187 connected to a sizer 188. The sizer can be of any suitable form, there being numerous sizers suitable for the purpose. The sizer shown has an axially erect cylindrical tank 189 in the upper end of which is mounted a conical screen 190. The screen 190 is preferably rotated about the axis of the tank by any suitable means, not shown. Beneath the screen 190 is a finer conical screen 191. It likewise is preferably rotatable about the axis of the tank. A chute 192 is extended from the tank adjacent to the periphery of the screen 190 and a similar chute 193 extended from the tank adjacent to the upper surface of the screen 191. Obviously, as many screens as desired may be utilized to segregate the pistachios into as many sizes as desired but pistachios are normally commercially graded into only two sizes and thus two screens are adequate with the lower screen being fine enough to discharge all small pistachios of edible quality through the chute 193. A bin 194 is positioned to receive pistachios from the chute 192 and a bin 195 positioned to receive pistachios from the chute 193. The pistachios in the bins are then salted, dried and packaged for market. A further pump 197 is preferably connected to the bottom of the sizer 188 and has a discharge conduit 198 connected to the hopper 174 to return water thereto.

While the pumps 163, 176, 186 and 197 and their respective systems provide excellent conveyance of the pistachios any other systems suitable for the purpose can be utilized without departing from the spirit or scope of the present invention.

OPERATION

The operation of the described embodiment of the present invention is believed to be clearly apparent and is briefly summarized at this point. In order to minimize staining of the shells of the pistachios, they should be delivered to the huller of the present invention immediately after harvest. In commercial operations, effort is made to hull the pistachios within twelve hours of their harvest. The huller of the present invention makes this practical to achieve because of its large volume speedy operation thus avoiding the staining of the shells and the previous necessity of dying the pistachios to hide the stains.

The pistachios 22 are delivered by the chute 23 into the hopper 21. They are metered by gate 25 so as gravitationally to descend onto the vibrating tray 28 in a thin layer of pistachios. As the tray vibrates, the unhulled pistachios are substantially aligned with the longitudinal grooves in the tray and are so delivered for descent between the rollers 32.

As the pistachios 22 descend from the tray 28 they fall between the rollers 32 which are rotated with their adjacent peripheries traveled downwardly but at different peripheral speeds. Since the elongated pistachios 22 are aligned with their direction of movement in the tray 28, they most frequently fall between the rollers with their longitudinal axes disposed in planes disposed transversely of the rollers for most effective tumbling action. Such disposition facilitates the rupturing and removal of the pericarp by the rollers. As the pistachios fall and are drawn between the rollers, the teeth 34 exercise a vigorous scrubbing action on the hulls and rupture the hulls to remove substantial portions thereof from the shells of the pistachios. As the pistachios are treated by the rollers 32, they gravitationally descend to the receiving end 97 of the second stage 11. As the pistachios reach the second stage, they have substantial portions of their pericarps removed but many of the pistachios have pieces of pericarp adherent to their shells having loosened tag ends 199 as shown in FIG. 12.

When the descending pistachios 22 reach the receiving end 97 of the second stage 11, they are moistened by the spray nozzles 150. They drop onto the fine rollers 95 and 96. Due to the action of the pitman 130 and the reciprocation of the rack gear 117 in mesh with the lower pinions 122, the rollers 96 are oscillated together. Because of the meshing of the lower pinions 122 with the upper pinions 123, the rollers 95 in the upper tier are oscillated together but oppositely to the rollers 96. Thus, the descending pistachios fall between the rollers 95 and are supported on the rollers 96. Because of the opposite directions of oscillation, the adjacent peripheries of the rollers 95 and 96 travel in the same direction and reverse direction together. Thus, the tag ends 199 of the pistachios 22 are drawn between the rollers 95 and 96 and pulled from the pistachios. This action continues as the pistachios are urged longitudinally of the rollers 95 and 96 by spray from the nozzles 150 to discharge from the delivery end 98. During oscillation the rollers preferably rotate approximately two revolutions in each direction.

Spray from the nozzles 150 washes hulls and other debris from the pistachios as they travel longitudinally of the rollers 95 and 96 for descent into the tank 160. From the tank, the water containing the hull fragments and other debris is pumped through the conduit 162 by the pump 163 and upwardly through the conduit 164 where the debris is screened out by the screen 166 and descends into the bin 167 while the water is captured by the funnel 168 and returned to the tank through the conduit 169.

The hulled pistachios and a substantial amount of water from the nozzles 150 descend from the delivery end 98 of the second stage 11 into the hopper 174. The water and hulled pistachios are then pumped through the conduit 175 by the pumped 176 through the discharge 177 and into the tank 178. The water level in the tank is maintained at a high level so that immature pistachios and any other buoyant debris received by the tank are floated off over the weir 180 for accumulation in the receiver 181 and subsequent discard. The check valve 179 precludes siphoning of water back from the tank 178 through the pump 176 to the hopper 174 when the pump is not in operation.

The pistachios 22, which then have been hulled and rinsed, descend in the tank 178 and pass through the conduit 185 to the pump 186 for delivery through the conduit 187 to the sizer 188. As the water borne pistachios strike the screen 190, the smaller thereof pass through the screen and the larger travel over the surface of the screen for discharge through the chute 192 into the bin 194 provided for the large pistachios. The smaller pistachios fall through the screen 190 and are collected on the screen 191 for delivery through the chute 193 to the bin 195 provided for the smaller pistachios. The pump 197 serves to return water received by the sizer 188 through the conduit 198 back to the hopper 174.

The huller of the present invention has been found to be exceedingly effective in mechanically removing the hulls from pistachios. The pistachios reaching the bins 194 and 195 are devoid of hulls, rinsed, sized, and have had the immature buoyant pistachios discarded therefrom. The graded and sized pistachios are then salted, dried, and packaged for sale.

Because of the large volume operation made possible by the huller of the present invention, vast quantities of pistachios can be hulled immediately following harvest so as to minimize staining of the shells and thus obviate the previously undesirable dying requirement.

By removing the nut and bolt assemblies 86, the upper portion 83 of the frame 20 carrying the bracket 76, shaft 77 and idler 78 can be removed from the lower portion 82 carrying the bracket 73, shaft 74 and idler 75 as well as supporting the shafts 41, sprockets 79 and rollers 32 to permit the ready release for repair or replacement of the rollers by either removing the bolts 67 of the second roller or the capscrews 47 of the first roller.

The elimination of the hand labor previously required to hull pistachios has effectively reduced the processing cost of such pistachios and made it economically feasible to raise pistachios in the United States without the exhorbitant labor costs incurred in the absence of mechanical hulling.

Although the invention has been herein shown and described in what is conceived to be the most practical and preferred embodiment, it is recognized that departures may be made therefrom within the scope of the invention.

Having described our invention, what we claim as new and desire to secure by Letters Patent is:

1. A two stage pistachio huller comprising first means for rupturing the pericarp of the pistachio and forming tag ends thereof adherent to the pistachios; and second means engageable with said tag ends to strip the pericarp from the pistachios, in which both of said means have coacting rollers, the first means having substantially horizontal and parallel rollers spaced for the passage of pistachios therebetween having adjacent peripheries traveled downwardly at different peripheral speeds, and the second means having substantially horizontal and parallel rollers having ends adapted to receive pistachios from the first means and opposite discharge ends, said rollers of the second means being spaced too closely for the passage of whole pistachios therebetween, and means to oscillate adjacent rollers of the second means alternately in opposite directions.

2. The huller of claim 2 having further means to subject the pistachios being treated with a water bath while subject to the action of the rollers of the second means.

3. A two stage pistachio huller comprising a first pair of substantially horizontal rollers, means mounting the rollers in adjacent spaced relation to receive pistachios to be hulled therebetween; means rotating the rollers at different peripheral speeds with their adjacent peripheries traveled downwardly; a multiplicity of elongated fine rollers of a diameter substantially less than that of the first pair of rollers; means mounting the fine rollers in closely adjacent paralell spaced relation so as to provide a receiving end adapted to receive preliminarily treated pistachios from the first rollers and an opposite discharge end, said fine rollers being alternately disposed in two tiers in substantially parallel upper and lower planes, the adjacent rollers in the opposite tiers being spaced too closely for the passage of pistachios therebetween and the adjacent rollers in the upper tier being spaced a distance sufficient to receive pistachios therebetween for support on the lower rollers, means connected to the fine rollers oscillating said rollers with the rollers in the same tier being rotated in a common direction and the rollers in the opposite tiers being rotated in the opposite direction; and means for advancing pistachios received from the first rollers longitudinally along the fine rollers to the discharge end.

4. The huller of claim 3 in which the means for advancing the pistachios along the fine rollers includes means for spraying water downwardly thereon and obliquely longitudinally thereof.

5. The huller of claim 3 including means for delivering pistachios to the first pair of rollers with the longitudinal axes of the pistachios disposed in substantial alignment with their direction of travel.

6. The huller of claim 3 in which the first rollers have resilient peripheries.

7. The huller of claim 6 in which the first rollers have longitudinal grooves defining radially disposed teeth therebetween extended longitudinally of the rollers.

8. The huller of claim 7 in which the teeth and grooves are substantially complementary and the teeth are substantially square.

9. The huller of claim 3 including drive pinions individually connected to the fine rollers with the pinions of the adjacent fine rollers in the alternate tiers being meshed with each other; a rack gear mounted for reciprocal longitudinal movement in mesh with the pinions of one tier; and powered means connected to the rack gear for longitudinal reciprocation thereof.

10. The huller of claim 4 having a tank disposed beneath the fine rollers to receive water and hull fragments therefrom.

11. The huller of claim 3 in which the first pair of rollers each has a concentric mounting shaft and in which the mounting means for the rollers comprises bearings individual to opposite ends of each shaft having their respective shafts journaled therein; and means supporting said bearings; the support means for at least one bearing of each shaft comprising a bracket having opposite end portions; means pivotally mounting one end of each bracket for pivotal movement of the opposite end thereof toward and from its respective bearing; and means releasably mounting said bearings in said opposite ends of their respective brackets, the bearings and their respective shafts being axially slidably separable to release the rollers from the bearings.

12. The huller of claim 11 in which said one end of each bracket is mounted for reciprocal adjustable movement transversely of the roller shafts whereby the rollers are adjustably spaced.

13. A two stage pistachio huller comprising:
A. a first pair of substantially horizontal rollers;
B. means mounting the rollers in adjacent spaced relation having peripheries spaced to receive pistachios to be hulled in abrading engagement therebetween;
C. means rotating the rollers to cause their adjacent peripheries to have relative travel;
D. a plurality of elongated fine rollers of a diameter substantially less than that of the first pair of rollers;
E. means mounting the fine rollers in closely adjacent spaced relation to receive pistachios from the first pair of rollers,
 1. said fine rollers being alternately disposed in two tiers in substantially horizontal upper and lower planes, the adjacent rollers in the opposite tiers being spaced sufficiently closely to support pistachios therebetween and the adjacent rollers in the upper tier being spaced a distance sufficient to receive pistachios therebetween for support on the lower rollers and between the adjacent rollers in the opposite tiers; and
F. means to oscillate the adjacent fine rollers in opposite directions.

14. The pistachio huller of claim 13 in which the rotating means rotates the first pair of rollers with their adjacent peripheries traveled downwardly and the oscillating means oscillates the fine rollers in alternate directions.

15. The pistachio huller of claim 13 including means for directing a water spray obliquely longitudinally against the fine rollers to advance pistachios therealong.

* * * * *

UNITED STATES PATENT AND TRADEMARK OFFICE
CERTIFICATE OF CORRECTION

PATENT NO. : 4,034,665
DATED : July 12, 1977
INVENTOR(S) : Jay J. McFarland and Bertram E. Saunders It is certified that error appears in the above-identified patent and that said Letters Patent are hereby corrected as shown below:

Column 3, Line 37, delete "gearm" and insert --- gear ---.

Column 9, Line 46, delete "paralell" and insert --- parallel ---.

Signed and Sealed this

Eighth Day of November 1977

[SEAL]

Attest:

RUTH C. MASON
*Attesting Officer*

LUTRELLE F. PARKER
*Acting Commissioner of Patents and Trademarks*